…

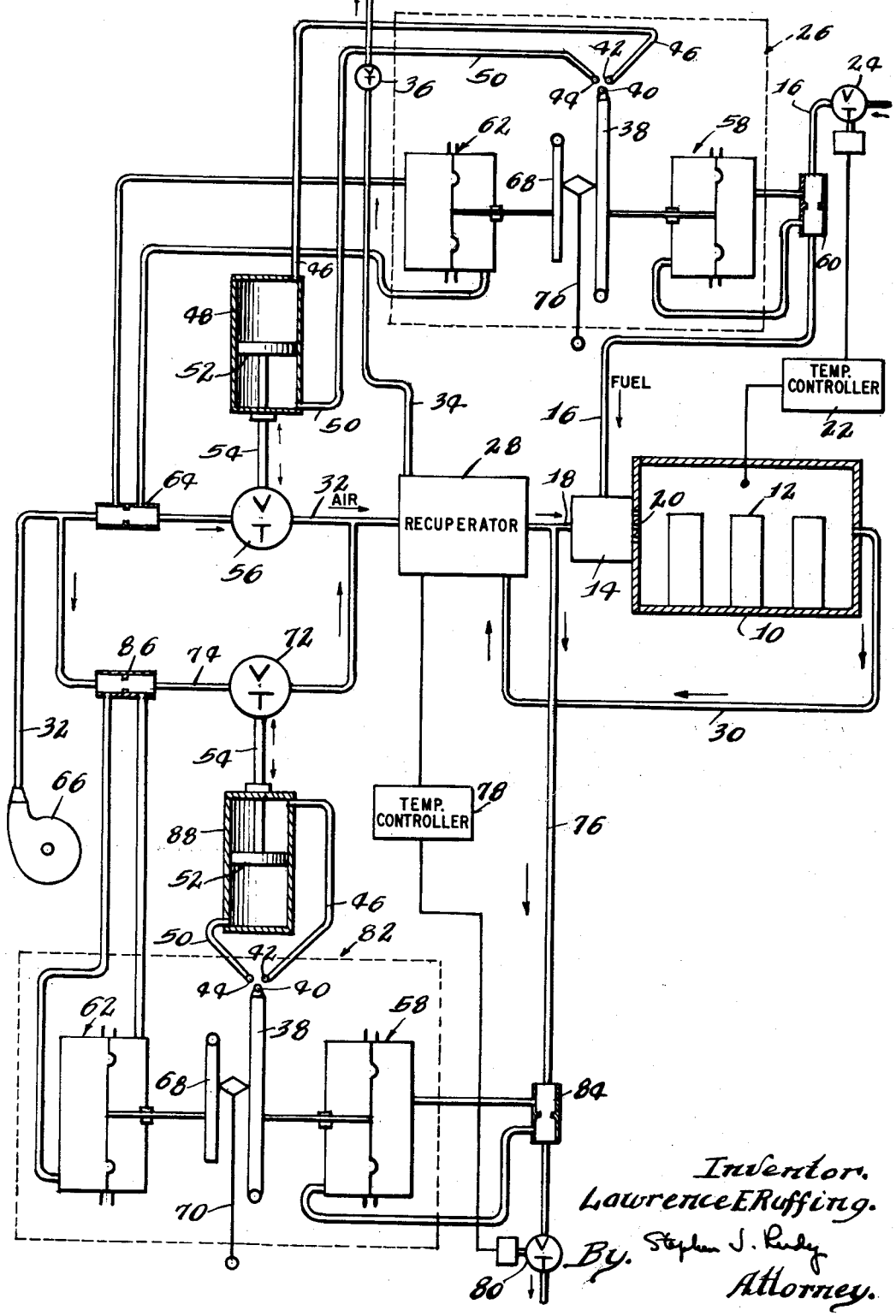
June 16, 1964 — L. E. RUFFING — 3,137,341
HEAT EXCHANGER TEMPERATURE CONTROL SYSTEM
Original Filed Aug. 4, 1958
Inventor.
Lawrence E Ruffing.
By Stephen J. Rudy
Attorney.

United States Patent Office 3,137,341
Patented June 16, 1964

3,137,341
HEAT EXCHANGER TEMPERATURE
CONTROL SYSTEM
Lawrence E. Ruffing, Cleveland, Ohio, assignor to Askania Regulator Company, Chicago, Ill., a corporation of Illinois
Continuation of abandoned application Ser. No. 752,910, Aug. 4, 1958. This application Aug. 20, 1962, Ser. No. 221,393
8 Claims. (Cl. 165—32)

This invention relates to a heat exchanger temperature control system and more particularly to a control system for a metallic recuperator used with a soaking pit furnace. This application is a continuation of my prior copending application Serial No. 752,910 filed August 4, 1958, now abandoned.

In a soaking pit furnace, the combustible input flow is regulated in accordance with predetermined temperature requirements of the furnace. Recuperators used with such furnaces may be of the ceramic or tile type, or of the metallic type. In the ceramic type of recuperator there is little danger of damaging the ceramic due to high temperatures. However, in the case of metallic recuperators, excessive temperatures can damage the metal heat exchange surfaces. Since the inflow air to the recuperator is measured on the inlet side of the recuperator and is controlled in accordance with the fuel input flow to the mixing chamber of the furnace, decrease in fuel input flow as the furnace approaches or reaches operating temperature results in decrease in air inflow through the recuperator. Under such conditions, the temperature of the recuperator can rapidly rise to the point where the metal of the heat exchange surfaces may be damaged.

The control system of the invention prevents excessive rise of recuperator temperature under such conditions, by utilizing a bleed-off valve on the outlet side of the recuperator which is under control of a recuperator temperature means and by utilizing a by-pass valve on the input side of the recuperator which is under control of a regulator responsive to the setting of the bleed-off valve. In such manner, the control system of the invention operates to provide an excess of air to the recuperator, which is bled off after passing through the recuperator. The temperature of the recuperator is thus maintained within a maximum limit, while at the same time the combustible input flow to the furnace is regulated in accordance with furnace temperature requirements. Thus the temperature of the recuperators may be controlled without interfering with the proper furnace fuel/air ratio. The control system of the invention further features slow operation of the bleed-off valve and the by-pass valve, whereby cycling or instability of the system is prevented.

The main object of this invention is to provide a heat-exchanger temperature control system.

A more specific object is to provide a control system which prevents excessive temperature development in a metallic recuperator whereby the latter is protected against overheating.

Another object is to provide a control system for a recuperator in which cycling or instability is prevented.

These and further objects and features of the invention will become more apparent from the following description and accompanying drawing wherein:

The figure is a schematic diagram illustrating the control system of the invention as applied to a metallic recuperator.

Referring now to the drawing, the numeral 10 identifies a soaking pit furnace of a common type in which metal billets 12 have been placed for curing or heating preparatory to further operations thereupon. A mixing chamber 14 is arranged adjacent to the furnace for receiving a supply of fuel from a pipe or conduit 16, and a supply of air from a pipe or conduit 18, whereby a combustible mixture is produced and ejected through nozzles or orifices 20, into the interior of the furnace for combustion therein. An adjustable temperature controller 22 is adapted to operate a valve 24 arranged in the pipe 16 whereby flow of fuel therein is regulated in accordance with predetermined temperature requirements of the furnace 10.

A relay regulator 26, incorporating the well known jet pipe principle, is adapted to control air flow to the mixing chamber 14 in proportion to the volume of fuel flowing in pipe 16. A recuperator 28 having metal heat exchange surfaces (not shown) is arranged to receive hot waste from the furnace 10 via a pipe or conduit 30, which hot waste flows on one side of the heat exchange surfaces and gives up heat thereto. The opposite side of the heat exchange surfaces is exposed to combustion air flowing into the recuperator via an air inflow pipe or conduit 32, which air leaves the recuperator in heated condition via the pipe 18, which serves as an outflow passage from the recuperator. The cooled waste flows from the recuperator into an exhaust pipe or conduit 34, in which may be arranged a flow control valve 36. As will be explained in more detail, the recuperator 28 is connected to two inflow passages controlled by valves 56 and 72, respectively; and the recuperator heated air exits through two outflow passages 18 and 76, respectively, passage 18 leading to soaking pit furnace 10, a form of utilization device, and passage 76 bleeding off fluid through valve 80.

The relay regulator 26 includes a jet pipe 38, which is pivoted at its lower end and has an orifice 40 at its upper end arranged for arcuate travel between apertures 42 and 44, forming a receiver portion of the regulator. Aperture 42 forms one end of a pipe or conduit 46, the other end of which opens into one end of a cylinder assembly 48, while aperture 44 forms one end of a pipe or conduit 50, the other end of which opens into the other end of the cylinder assembly 48. A piston 52, slidably arranged in the cylinder 48, has a piston rod 54 affixed thereto, which is connected to an inflow control valve 56 in the air inflow pipe 32. The position of the piston 52 within the cylinder 48, thus determines the volume of air flow in pipe 32. Upward movement of the piston 52 results in opening the valve 56, while downward movement of the piston results in closing the valve. Movement of the piston 52 is caused by a pressure differential thereupon created by the position of the jet pipe orifice 40 relative to the receiver apertures 42 and 44. When the jet pipe is midway, or equal distance, from the apertures 42 and 44, the pressure fluid flowing from the orifice will result in equal pressures in the pipes 46 and 50, with no pressure differential on the piston 52. Consequently, the piston will not move in either direction within the cylinder. Movement of the jet pipe orifice 40 toward apertures 42 will result in greater pressure in pipe 46 than in pipe 50, causing a pressure differential on the piston 52 resulting in downward movement thereof. Movement of the jet pipe orifice 40 toward aperture 44 will result in greater pressure in pipe 50 than in pipe 46, causing a pressure differential on the piston 52 resulting in upward movement thereof.

Jet pipe movement is caused by two opposing forces, one of which is generated by a diaphragm assembly 58 operated by a pressure differential across an orifice 60 arranged in the fuel pipe 16, the other of which is generated by a diaphragm assembly 62 operated by a pressure differential across an orifice 64 arranged in the air inflow pipe 32, the latter being connected to an air pressure generating source, such as blower 66. The regulator 26 incorporates a ratio regulator in the form of a lever 68, pivotally mounted at its upper end, and a slider 70 which is in contact with and positionable along the length of the lever 68 and jet pipe 38, to vary degree of response movements of the jet pipe to changes of force exerted by the diaphragm assemblies. By such means, the fuel-air ratio delivered to the mixing chamber 14 may be adjusted in accordance with furnace temperature requirements. Thus it may be seen that valve 56 is controlled in accordance with the air required to maintain a desired fuel/air ratio, with the amount of fuel being supplied being controlled in accordance with furnace temperature. This valve, and conduit 32, will be seen to comprise a first inflow passage means to recuperator 28.

With operation of the system above described, it will be seen that as the furnace 10 is brought up to temperature and so maintained, the combustible mixture input thereto will be reduced by means of the temperature controller 22, and a reduction of air flow will take place from pipe 32 through the recuperator 28 and about the heat transfer surfaces therein. As a result, the heat transfer surfaces will be subjected to an accelerated heat rise which would result in damage thereto, if allowed to continue.

The control system of the invention will automatically operate to avoid excessive temperature rise in the recuperator 28 under the above described conditions. To effect such results a by-pass valve 72 in a pipe 74 is arranged to divert a controlled amount of air from the blower 66, around the valve 56. The amount of by-pass air will be substantially equal to the amount of air being bled off to atmosphere via a pipe or conduit 76 connected to the pipe 18, i.e., between the recuperator 28 and the mixing chamber 14. Such by-pass air flowing through the recuperator will serve to keep the temperature of the heat transfer surfaces thereof within safe limits. At the same time, the measurement of air for reduced rate combustion, passing through the valve 56 will not be disturbed.

Regulation of the bleed-off air in pipe 76 is established by a temperature controller 78, which is adapted to regulate a valve 80 arranged in the pipe 76. The controller 78 is adapted to cause opening movement of valve 80 as the temperature in the recuperator 28 approaches a predetermined temperature range, thus causing an increased air flow in the recuperator due to increase in by-pass air through valve 72.

Operation of the valve 72 is provided by a relay regulator 82 which is substantially identical in structure and operating principle to relay regulator 26. The diaphragm assembly 58 of regulator 82 is operated by a pressure differential across an orifice 84 arranged in the bleed-off pipe 76 to derive a bleed-off flow signal, while the diaphragm assembly 62 of regulator 82 is operated by a pressure differential across an orifice 86 arranged in the by-pass pipe 74 to derive a signal commensurate with added flow through conduit 74 and valve 72. The receiver pipes 46 and 50 lead to opposite ends of a cylinder arrangement 88, which is substantially identical in structure and operating principle to cylinder assembly 48, heretofore described.

The slider 70 of the regulator 82 may be positioned to vary degree of response movement of the jet pipe 38 to changes of force exerted by the diaphragm assemblies. By such means, the relationship of by-pass air flow in pipe 74 to bleed-off air flow in pipe 76 may be adjusted as desired.

From the foregoing it will be seen that the control system of the invention will automatically operate, by a novel by-pass and bleed-off arrangement, to prevent excessive temperature rise in the recuperator 28, when the furnace 10 has been brought up to operating temperature and input air flow to the recuperator has been decreased. It will also be seen that the operating rate of the bleed-off valve and by-pass valve may be relatively slow so that cycling or instability of the overall control system is prevented.

The foregoing description has been given in detail without thought of limitation since the inventive principles involved are capable of assuming other forms without departing from the spirit of the invention or the scope of the following claims.

I claim:

1. A heat exchanger temperature control system comprising,
   (a) a heat exchanger including an outflow passage adapted to pre-heat combustion air being supplied to a furnace installation in accordance with the hot waste air conveyed from said furnace installation, said furnace installation including a fuel/air ratio controller with the amount of fuel being applied thereto being inversely proportional to the furnace temperature;
   (b) an inflow control valve responsive to said fuel/air controller for regulating the volume of combustion air delivered to said furnace heat exchanger;
   (c) a by-pass valve positioned in parallel with said inflow control valve to divert a controlled amount of air around said inflow control valve;
   (d) a bleed-off valve connected to the outflow passage from said heat exchanger to divert controlled amounts of pre-heated air to atmosphere;
   (e) means responsive to heat rise in said heat exchanger to increase the amount of pre-heated air diverted to atmosphere; and
   (f) means rseponsive to the volume of pre-heated air diverted to atmosphere to control the operation of said by-pass valve, whereby the by-pass and bleed-off valves in combination operate to maintain the heat transfer surfaces within said heat exchanger within safe limits while the regulated volume of combustion air through said inflow control valve is uneffected.

2. A heat exchanger temperature control system comprising,
   (a) a furnace, the temperature of which is controlled by control of the quantity of fuel applied to said furnace;
   (b) a heat exchanger including a least one inflow passage and at least one outflow passage, said heat exchanger being supplied with hot waste gas from said furnace and adapted to preheat combustion air being mixed with fuel and delivered to said furnace;
   (c) means coupling said at least one outflow passage of said heat exchanger to said furnace;
   (d) an inflow control valve regulating the volume of combustion air being mixed with said fuel and responsive to the quantity of fuel applied to said furnace to maintain a desired fuel/air ratio;
   (e) a by-pass valve positioned in parallel with said inflow control valve to divert a controlled volume of air around said inflow control valve;
   (f) means for bleeding-off to atmosphere a portion of the volume of pre-heated air from said at least one outflow passage of said heat exchanger;
   (g) said last named means operable to increase the quantity of air bled off in response to a temperature increase within said heat exchanger;
   (h) means for measuring the volume of said bled off air and for increasing the controlled air diverted through said bypass valve by a substantially equal amount in order to control the temperature within said heat exchanger without adversely interfering with said desired fuel/air ratio.

3. A heat exchanger temperature control system, comprising in combination: a heat exchanger device having first and second inflow passage means adapted to receive a medium whose temperature is to be affected, and having first and second outflow passage means for delivering said medium of affected temperature, said first inflow passage means having a first valve controlled in accordance with an independent variable for controlling a first volume flow of said medium into said heat exchanger device, said first outflow passage means being connected to supply said first volume flow of said medium of affected temperature to a utilization device, said second outflow passage means having second valve means controlled in accordance with an increase in the temperature condition of said heat exchanger device for controlling bleed-off of a second volume flow of said medium to atmosphere, and said second inflow passage means having third valve means controlled in accordance with said second volume flow of said medium through said second outflow passage means for controlling supply of said second volume flow of said medium to said heat exchanger device, in order that the temperature control of said heat exchanger device is determined by the sum of said first and second volume flow of said medium and said second volume flow does not substantially affect the relationship between said independent variable and the amount of temperature-affected fluid medium supplied to said utilization device.

4. A system according to claim 3 in which said heat exchanger device comprises a recuperator and said utilization device comprises an ingot soaking pit furnace, said recuperator being supplied with hot waste gas from said furnace and being operable to pre-heat combustion air being mixed with fuel and supplied to said furnace.

5. A system according to claim 3 in which said utilization device comprises a furnace, and in which said independent variable varies according to the temperature of said furnace.

6. A system according to claim 3 in which said first inflow passage means includes a control regulator operable to control said first valve in accordance with flow of a second medium to said utilization device.

7. A system according to claim 3 in which said second outflow passage means includes a control regulator operable to control said third valve means.

8. A system according to claim 3 in which said second inflow passage means includes a control regulator responsive to flow through said second outflow passage for controlling said third valve means.

References Cited in the file of this patent

UNITED STATES PATENTS

| | | |
|---|---|---|
| 2,052,375 | Wunsch et al. | Aug. 25, 1936 |
| 2,947,522 | Keller | Aug. 2, 1960 |
| 3,007,681 | Keller | Nov. 7, 1961 |